(12) United States Patent
Lee et al.

(10) Patent No.: US 11,176,040 B2
(45) Date of Patent: Nov. 16, 2021

(54) METHOD AND APPARATUS FOR UNIFORM MEMORY ACCESS IN A STORAGE CLUSTER

(71) Applicant: Netlist, Inc., Irvine, CA (US)

(72) Inventors: Hyun Lee, Irvine, CA (US); Junkil Ryu, Irvine, CA (US)

(73) Assignee: Netlist, Inc., Irvine, CA (US)

( * ) Notice: Subject to any disclaimer, the term of this patent is extended or adjusted under 35 U.S.C. 154(b) by 51 days.

(21) Appl. No.: 16/835,024

(22) Filed: Mar. 30, 2020

(65) Prior Publication Data

US 2020/0334150 A1  Oct. 22, 2020

Related U.S. Application Data

(63) Continuation of application No. 16/171,139, filed on Oct. 25, 2018, now Pat. No. 10,606,753, which is a
(Continued)

(51) Int. Cl.
*G06F 12/10* (2016.01)
*G06F 12/0813* (2016.01)
(Continued)

(52) U.S. Cl.
CPC .......... *G06F 12/0813* (2013.01); *G06F 9/455* (2013.01); *G06F 12/0284* (2013.01);
(Continued)

(58) Field of Classification Search
CPC ............... G06F 12/109; G06F 12/0813; G06F 12/0284; G06F 12/1054; G06F 9/455
(Continued)

(56) References Cited

U.S. PATENT DOCUMENTS 6,275,900 B1   8/2001  Liberty
6,658,538 B2 * 12/2003  Arimilli .............. G06F 12/1009
                                                        711/141
(Continued)

FOREIGN PATENT DOCUMENTS

EP         1988473 A1    11/2008

OTHER PUBLICATIONS

Netlist, Inc., International Search Report and Written Opinion, PCT/US2017/029478, dated Jun. 30, 2017, 12 pgs.
(Continued)

*Primary Examiner* — Than Nguyen
(74) *Attorney, Agent, or Firm* — USCH Law, PC

(57) ABSTRACT

The present application presents a Uniform Memory Access (UMA) network including a cluster of UMA nodes each having at least one UMA memory unit and a server local to the at least one UMA memory unit. A respective UMA memory unit in a respective UMA node comprises persistent memory; non-persistent memory, a node control device operatively coupled to the persistent memory and the non-persistent memory, a local interface for interfacing with the local server in the respective UMA node, and a network interface for interfacing with the UMA network. The node control device is configured to translate between a local unified memory access (UMA) address space accessible by applications running on the local server and a global UMA address space that is mapped to a physical UMA address space. The physical UMA address space includes physical address spaces associated with different UMA nodes in the cluster of UMA nodes. Thus, a server in the UMA network can access the physical address spaces at other UMA nodes without going through the servers in the other UMA nodes.

20 Claims, 17 Drawing Sheets

Related U.S. Application Data continuation of application No. PCT/US2017/029478, filed on Apr. 25, 2017.

(60) Provisional application No. 62/327,438, filed on Apr. 25, 2016.

(51) Int. Cl.

| | |
|---|---|
| *G06F 9/455* | (2018.01) |
| *G06F 13/00* | (2006.01) |
| *H04L 29/08* | (2006.01) |
| *G06F 12/109* | (2016.01) |
| *G06F 12/02* | (2006.01) |
| *G06F 12/1045* | (2016.01) |

(52) U.S. Cl.
CPC ........ *G06F 12/109* (2013.01); *G06F 12/1054* (2013.01); *G06F 13/00* (2013.01); *H04L 29/08* (2013.01); *G06F 2212/1044* (2013.01)

(58) Field of Classification Search
USPC ........................................................ 711/120
See application file for complete search history.

(56) References Cited

U.S. PATENT DOCUMENTS

| | | |
|---|---|---|
| 2004/0260905 A1 | 12/2004 | Cypher et al. |
| 2005/0044301 A1 | 2/2005 | Vasilevsky et al. |
| 2008/0189435 A1* | 8/2008 | Ali ................. H04W 40/24 709/242 |
| 2009/0198918 A1 | 8/2009 | Arimilli et al. |
| 2011/0078406 A1 | 3/2011 | Nickolls et al. |
| 2012/0075319 A1 | 3/2012 | Dally |
| 2014/0207871 A1 | 7/2014 | Miloushev et al. |
| 2014/0247832 A1 | 9/2014 | Shachar et al. |
| 2017/0344283 A1* | 11/2017 | Guim Bernat ........ G06F 3/0619 |

OTHER PUBLICATIONS

Netlist, Inc., International Preliminary Report on Patentability, PCT/US2017/029478, dated Oct. 30, 2018, 10 pgs.

Netlist, inc., Supplementary European Search Report, European Patent Application 17790291.3, dated Feb. 27, 2020.

Response to European Patent Application No. 17790291.3, based on PCT/US2017/029478, dated Mar. 4, 2020, 17 pgs.

\* cited by examiner

| Pkt type | UMA node address | Requester address | Access Type | Access priority | Total Byte size to transfer | CRC | 1110 |

Request packet

FIG. 11A

| Pkt type | UMA node address | Requester address | UMA memory address | CRC on/off | Dynamic real time commands | Data size | CRC | 1120 |

Command packet

FIG. 11B

| Pkt type | UMA node address | Requester address | Seq No. | Data | Data CRC | 1130 |

Data packet

FIG. 11C

| Pkt type | UMA node address | Requester address | Total Number of bytes transferred | No. Data pkts transferred | Reserved | CRC | 1140 |

Completion Status packet

FIG. 11D

| Pkt type | UMA node address | Requester address | Total Number of bytes transferred | No. Data pkts transferred | Error Data pkts Seq No. | CRC | 1150 |

Acknowledge packet

FIG. 11E

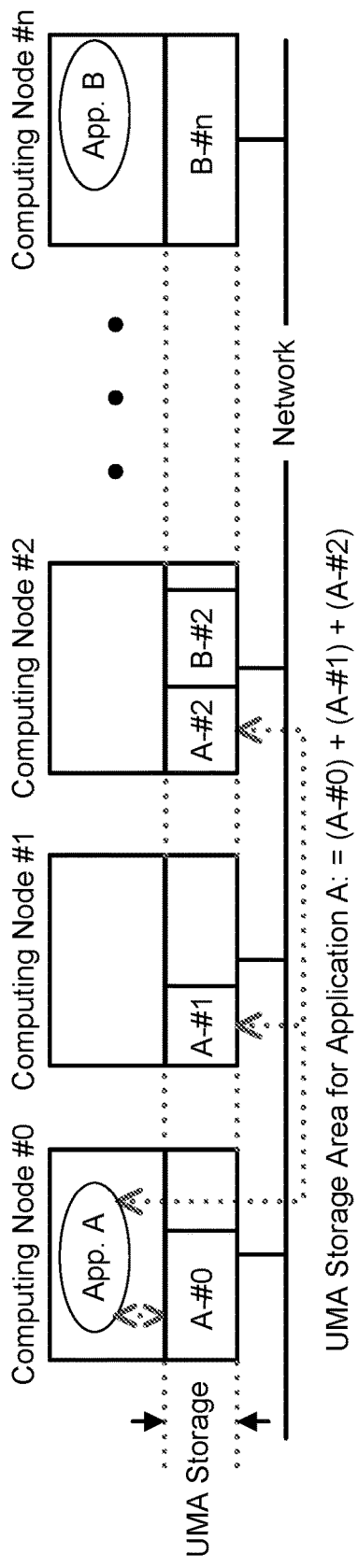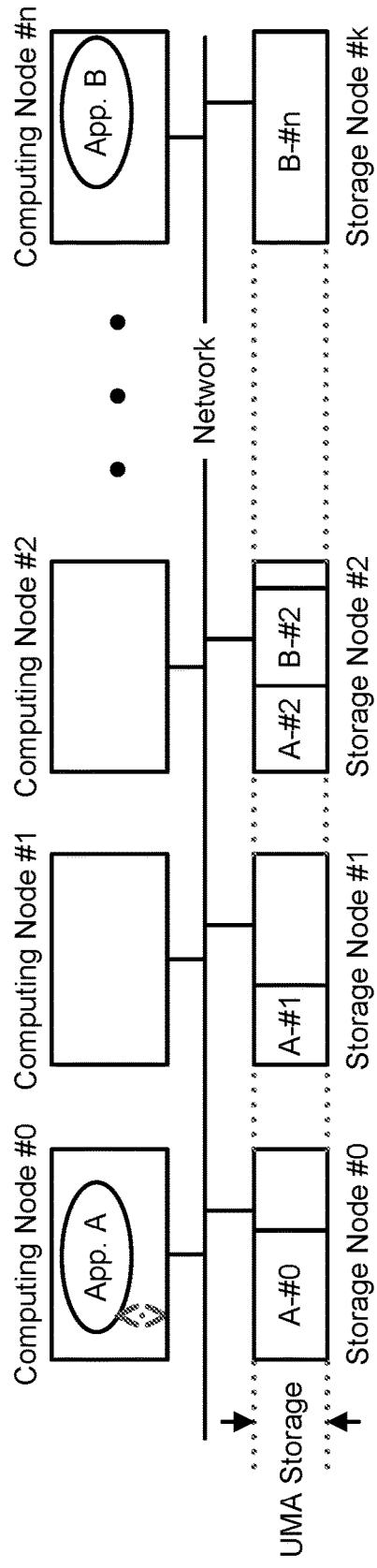
Figure 12A
Figure 12B

METHOD AND APPARATUS FOR UNIFORM MEMORY ACCESS IN A STORAGE CLUSTER

RELATED APPLICATION

This application is a continuation of U.S. patent application Ser. No. 16/171,139, filed on Oct. 25, 2018, entitled "Method and Apparatus for Uniform Memory Access in a Storage Cluster," which is a continuation of PCT Application Serial No. PCT/US2017/029478, filed Apr. 25, 2017, entitled "Method and Apparatus for Uniform Memory Access in a Storage Cluster," which claims the benefit of U.S. Provisional Application No. 62/327,438 filed Apr. 25, 2016, each of which is incorporated herein by reference in their entirety.

FIELD

The present application is related to computer storage, and more particularly to methods and apparatus for uniform memory access (UMA) of a storage cluster in a computer network.

BACKGROUND

The Non Uniform Memory Access (NUMA) network architecture used in a server network produces unpredictable memory access time in the server network. In the NUMA architecture, each server (node) has its own set of memories controlled by that server. Other nodes (servers) can access the memory via the RDMA (Remote DMA) access with permission from the owner (server) of the memory. The access route needs to go through a memory access controller (scheduler) under the control of the owner server, resulting in non-uniform memory access time and bandwidth. Furthermore, if the owner server fails, all memory accesses to its associated set of memories are blocked.

For an example, a NUMA network using Intel QPI (Quick Path Interconnect) presents significant degradation of memory access bandwidth when a server accesses the memory owned by other servers. In some instances, the memory bandwidth can be degraded by as much as 60% when a server accesses the memory owned by its next neighboring server, and by 80% when the server needs to accesses the memory owned by a server that is next to the next neighboring server (so called "one-removed).

SUMMARY

The present application presents apparatus and methods to support a novel shared memory network, i.e., the Uniform Memory Access (UMA) network, which removes non-uniformity in memory accesses across the network. According to certain embodiments, the UMA network includes a cluster of UMA nodes. Each UMA node includes at least one UMA memory unit and may further include a server local to the at least one UMA memory unit. A respective UMA memory unit at a respective UMA node comprises persistent memory, non-persistent memory, a node control device operatively coupled to the persistent memory and the non-persistent memory, a local interface for interfacing with the local server in the respective UMA node, and a network interface for interfacing with the UMA network.

In certain embodiments, the node control device comprises a set of control logic implemented using electronic circuits and software or firmware, including physical UMA access logic, cluster-wide UMA address management logic, and network transfer logic. The physical UMA access logic is configured to facilitate and control accesses by the local server of the persistent memory and/or the UMA network via the local interface. The cluster-wide UMA address management logic is configured to translate between a local unified memory access (UMA) address space and a global UMA address space.

In certain embodiments, the local UMA address space is accessible by applications running on the local server, while the global UMA address space is mapped to a physical UMA address space. The physical UMA address space includes physical address spaces associated with different UMA nodes in the cluster of UMA nodes. The network transfer logic is configured to communicate with the other nodes in the cluster of nodes command and data packets via the second interface. Thus, any server in the UMA network can access the physical address spaces associated with other UMA nodes across the UMA network without going through the servers at the other UMA nodes.

In certain embodiments, the global UMA address space is a shared address space managed by each individual UMA memory unit. The global UMA address space is not directly visible by the servers in the network, but each server can send a memory access request to the network to request access of any of the UMA memory units, as discussed above. Each server in the network can also broadcast a memory allocation request to the cluster. One or more UMA memory units, upon receiving the memory allocation request, would review its available memory space, and may respond with a memory allocation grant packet including an associated UMA address. The UMA memory units would also monitor the network for the memory allocation grant packet. If one UMA memory unit responds with such a packet, other UMA memory units would withdraw any pending response.

The requesting UMA node (requester) remembers the network address of the responder as a part of the UMA address, and it can manage the allocated UMA memory space without actually knowing the physical location or the memory density of the UMA memory unit. Thus, the UMA memory space can be constructed using a combination of memories having different densities, different memory types (e.g., hard disk drives (HDD), solid state disc drives (SDD), dynamic random access memory (DRAM), etc.).

In certain embodiments, the UMA address space is a two-layer address space, with a top layer comprised of the UMA network addresses of the UMA memory units in the cluster of UMA nodes, and a second layer comprised of the UMA memory space in each of cluster of UMA nodes. The top-layer network addresses can be visualized by the servers (requesters) connected to the UMA network. The second-layer address space is not seen by the requesters. However, each requester can access the second layer address space using an offset address.

BRIEF DESCRIPTION OF THE DRAWINGS

FIGS. 11A-11E are block diagrams of various UMA packets according to certain embodiments.

FIGS. 12A-12B are diagrams illustrating how UMA storage area for an application running on a server is distributed across different UMA nodes according to certain embodiments.

DETAILED DESCRIPTION OF THE EMBODIMENTS

Figure 1:
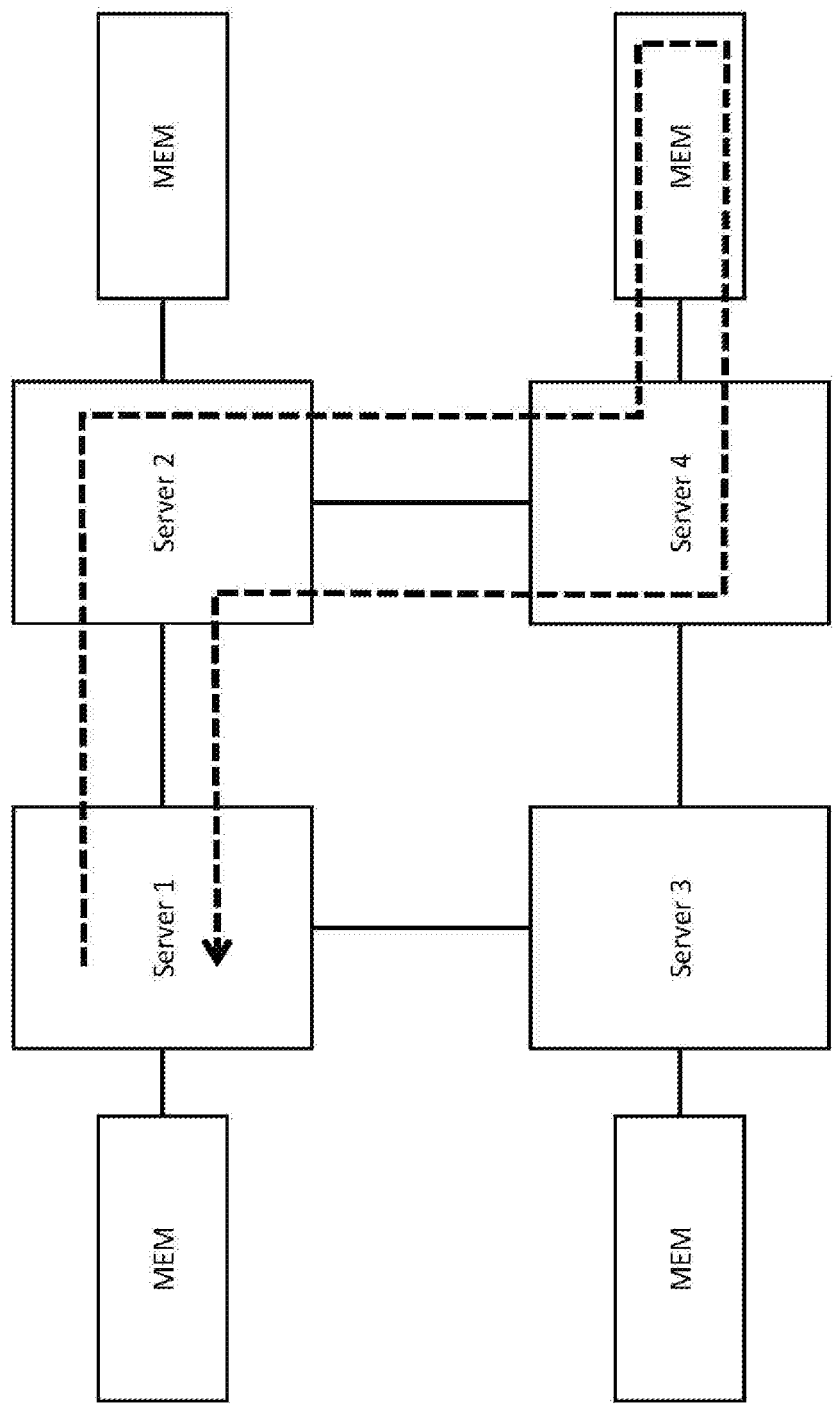
FIG. 1 is a block diagram of a conventional server network in which each server in the network is associated with memory controlled by the each server.

FIG. 1 is a block diagram of a conventional server network in which each server in the network is associated with memory controlled by the each server. FIG. 1 shows 4 servers, server 1, server 2, server 3 and server 4, each with local memory (MEM) that are connected via Intel QPI. When server 1 accesses the memory controlled by server 4, it needs to go through server 2 and server 4, as illustrated by the access path in dotted lines. Thus, the performance of server 1 is dependent on the memory access speed of server 4, which in turns depends on how busy server 4 is at the time. The performance of server 1 is also dependent of the data relay rate of server 2, which is dependent on how busy the central processing unit (CPU) of server 2 is at the time. In other words, the performance of server 1 is gated by what is going on with each server on the access path to the remote memory where the data is located. The UMA networks described below eliminate such limitations on the performance of a server in a network by removing the server CPU control from the network access path.

Figure 2A:
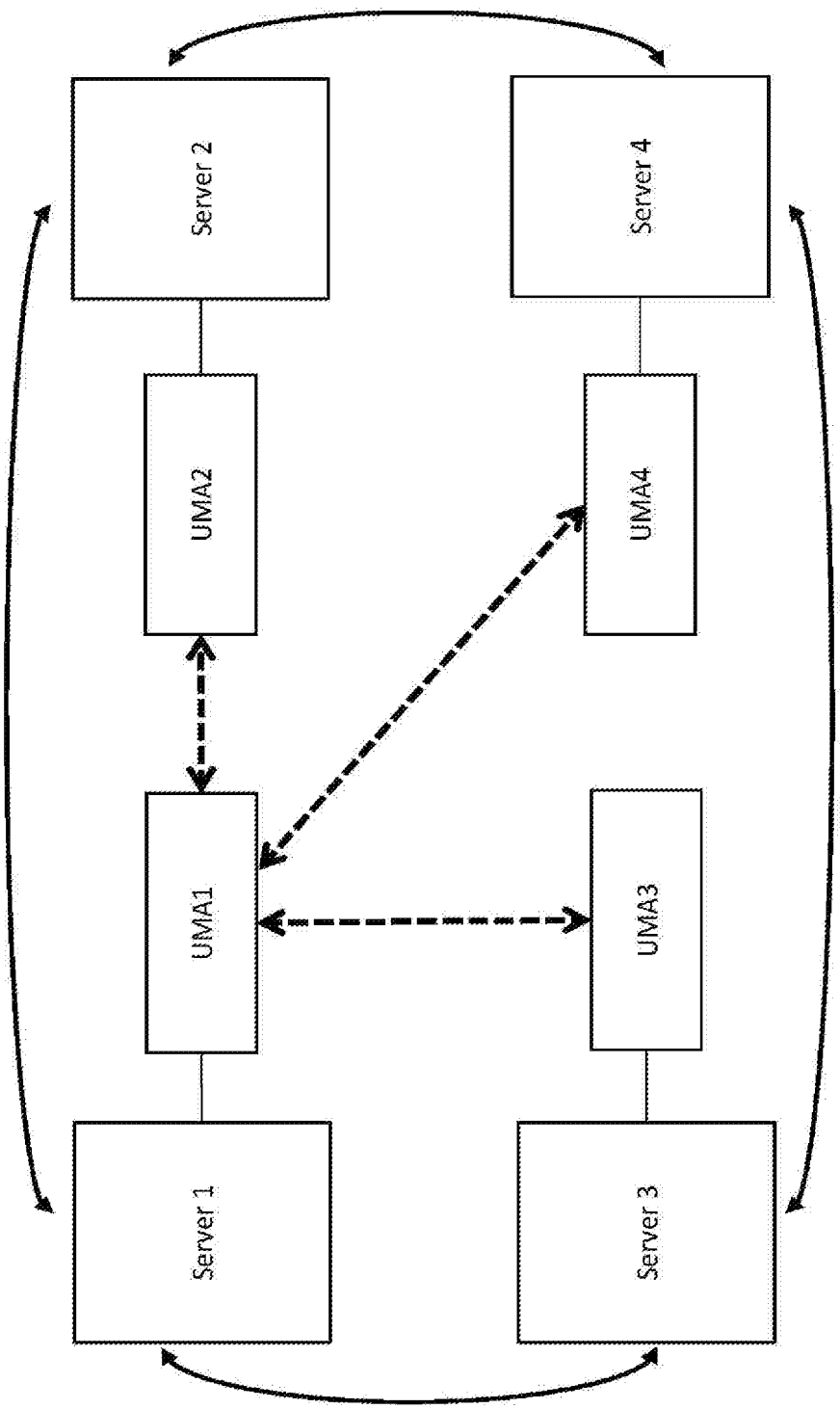
FIGS. 2A-2D are block diagrams of exemplary UMA networks according to certain embodiments.

FIGS. 2A-2D are block diagrams of exemplary UMA networks 200 according to certain embodiments. FIG. 2A shows a UMA network 200a having a cluster of 4 servers, server 1, server 2, server 3 and server 4, coupled to their respective UMA memory units, UMA1, UMA2, UMA3, and UMA4, respectively, and UMA access paths (illustrated using dotted lines) that run between the UMA memory units without going through any of the servers. In this case, any UMA memory unit can be directly accessed by any server in the cluster without going through another server. For example, server 1 can access UMA4, which is server 4's local memory, via the UMA network without going through server 2 or server 4. In a UMA network, a UMA memory unit, by itself or together with a local server, is sometimes referred to as a UMA node.

Figure 2C:
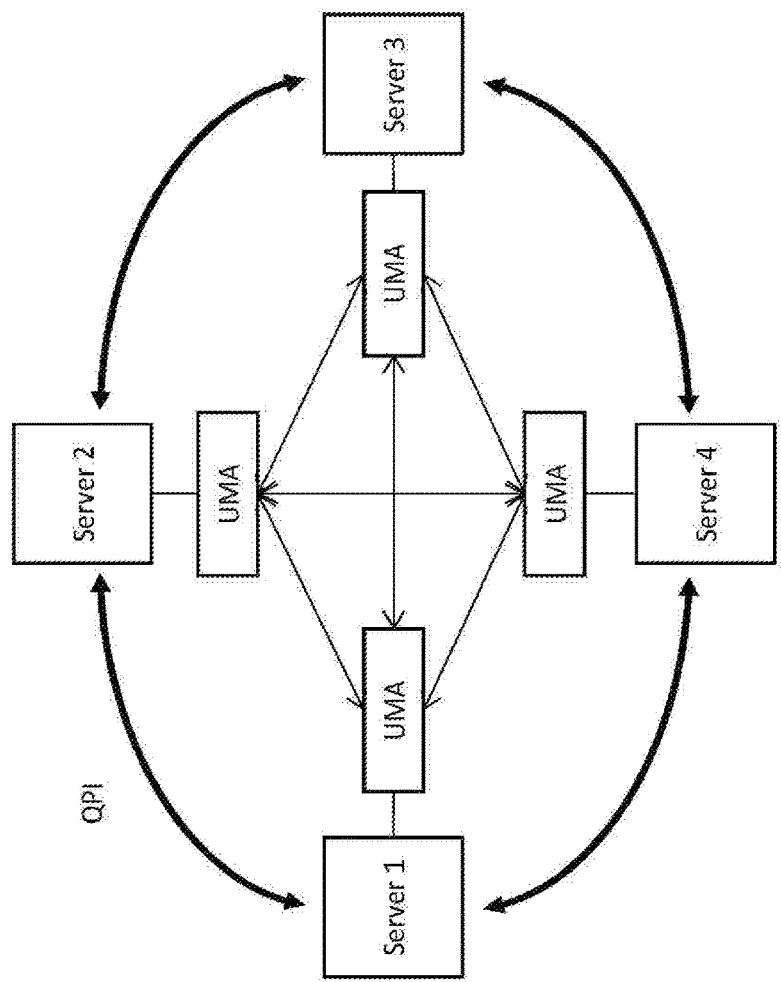
Figure 2B:
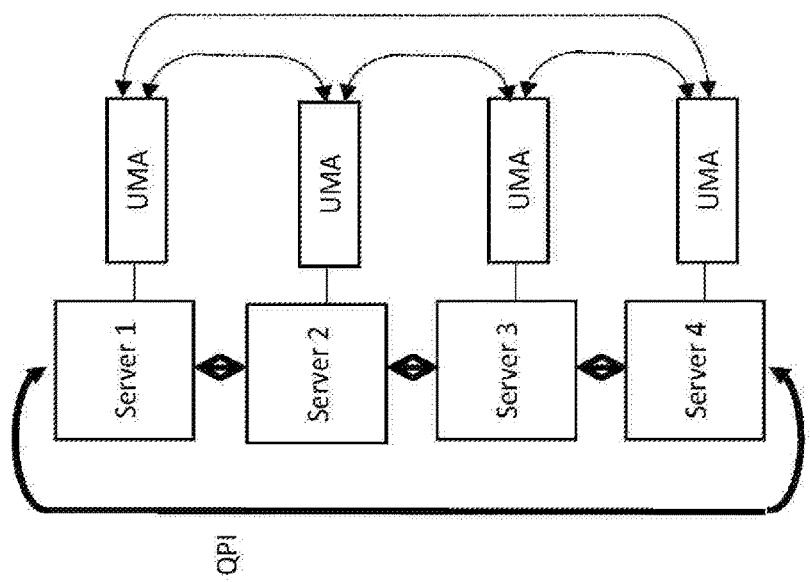
Figure 2D:
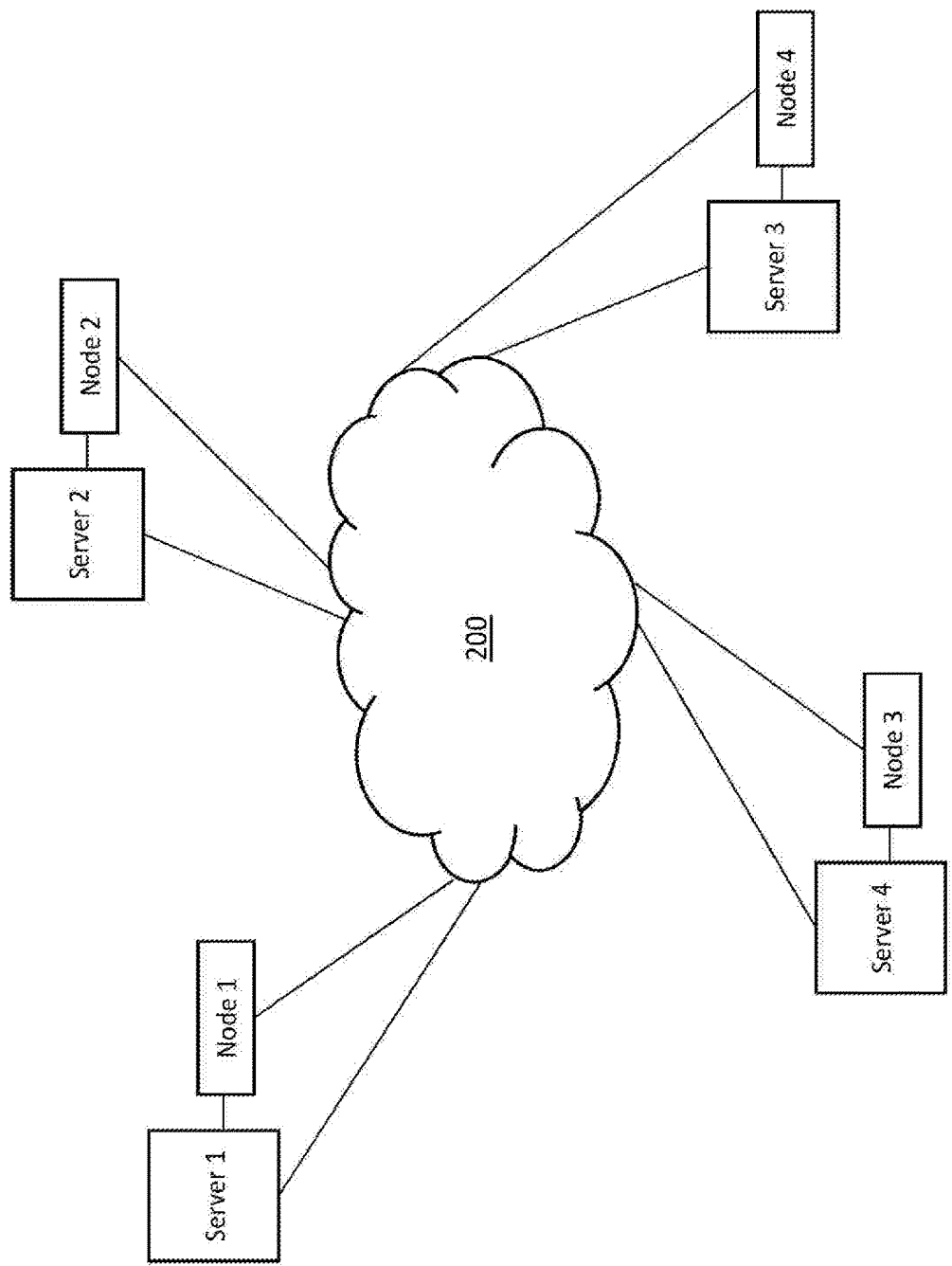

The UMA nodes in a UMA cluster can be connected with each other in any of a variety of configurations. For example, FIG. 2B illustrates a UMA cluster 200b where the UMA nodes are directly connected with each other via a daisy chain, and FIG. 2C illustrates a UMA cluster 200c where the UMA nodes are directly connected with each other via a star-network. The UMA nodes in a UMA cluster 200d may also be connected with each other via a local or wide-area network 201, as shown in FIG. 2D. Network 201 can be, for example, a packet-based network, such as the Internet. In certain embodiments, multiple UMA clusters can be included in a UMA network to support a large UMA memory space.

The UMA networks according to certain embodiments can be operated with various arbitration types, such as "first come—first serve," token ring, or other type of priority assignment, but there is no favor or a preset priority arrangement amongst the UMA nodes.

Thus, by removing server CPU control from network access paths, there is no preferred or designated access controller for any given UMA memory unit in a UMA network. Thus, each UMA unit schedules memory accesses by remote servers along with memory accesses by its local server, resulting in much faster data transfers across the network.

Figure 3:
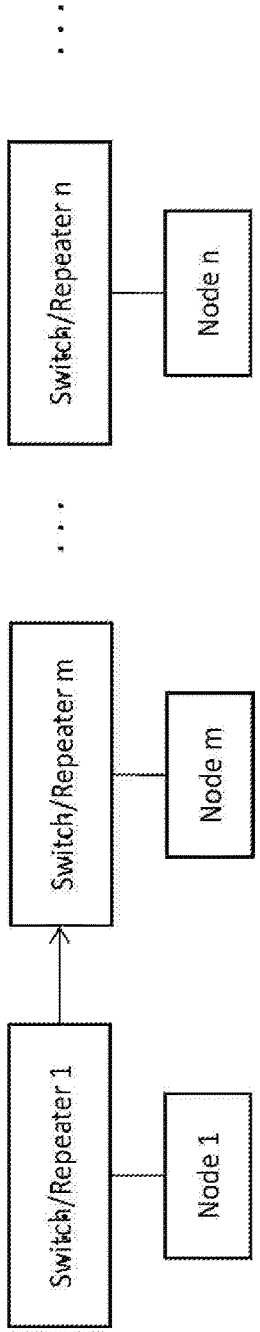
FIG. 3 is a block diagram of a plurality of network switches coupled to respective UMA nodes in a UMA network according to certain embodiments.
Figure 4:
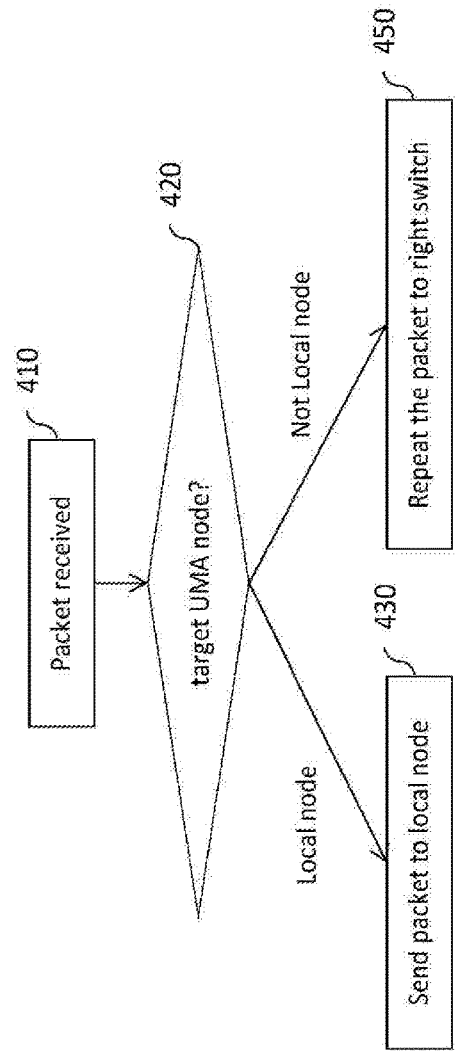
FIG. 4 is a flowchart illustrating a method performed by a network switch coupled to a UMA node according to certain embodiments.

In certain embodiments, each UMA node has a network interface, which can be embedded in or attached to the UMA node and may include a network switch/repeater for adding more UMA nodes to the network to expand servers or UMA nodes. The media access control MAC in the network switch generates multiple sets of data bus pairs that connect to the UMA nodes. FIG. 3 is a block diagram of a plurality of network switches/repeaters coupled to (or embedded in) respective UMA nodes in a UMA network according to certain embodiments. FIG. 4 is a UMA network interface operational flowchart according to certain embodiments. As shown in FIG. 4, when the network interface receives (410) a UMA memory access packet, it determines (420) a target UMA node for the UMA memory access packet. If the target UMA node is the UMA node local to the network interface, it sends (430) the packet to the local UMA node. Otherwise, it repeats (450) the packet to the next network switch.

Figure 5:
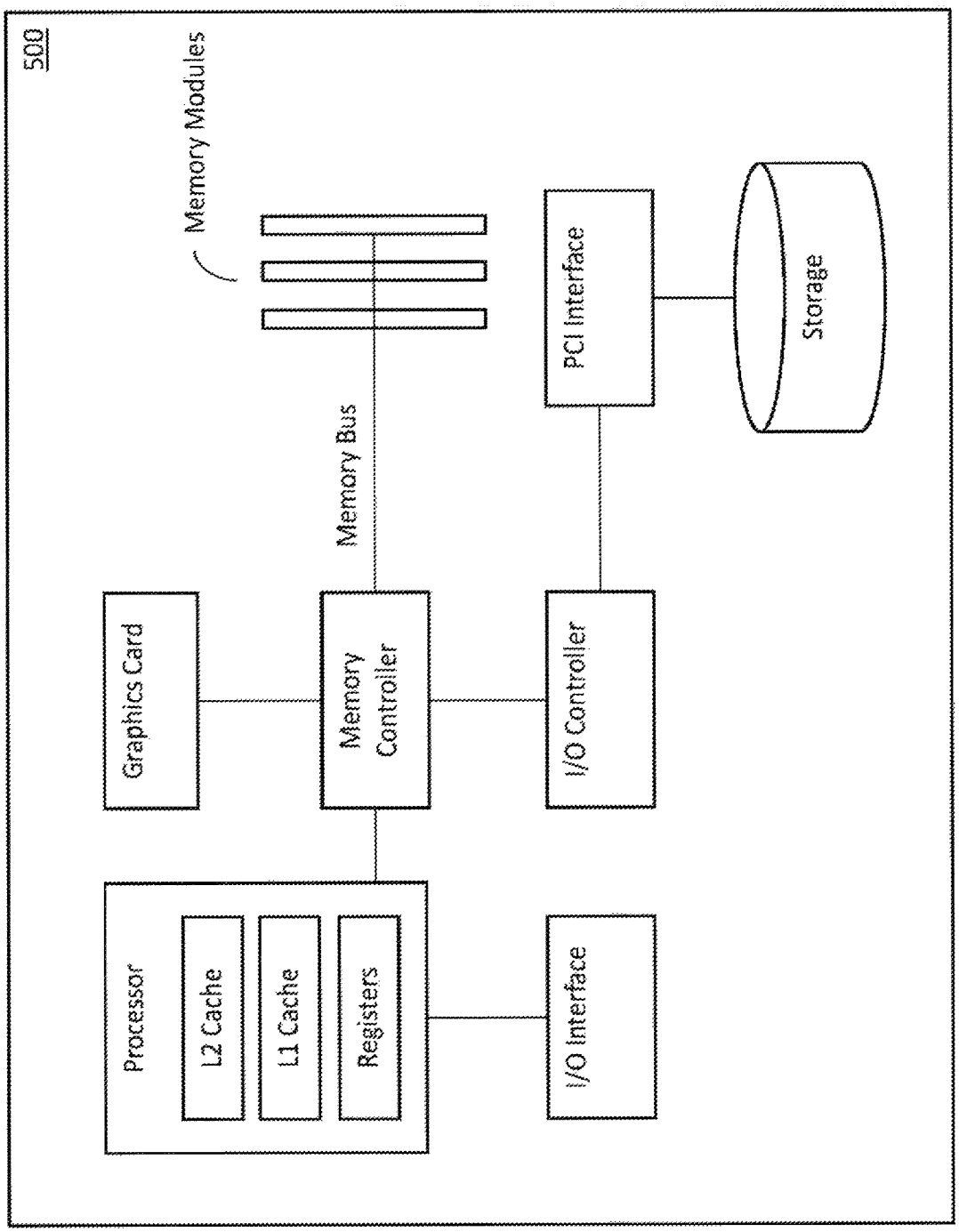
FIG. 5 is a block diagram of a UMA node according to certain embodiments.

FIG. 5 is a block diagram of a UMA node 500 according to certain embodiments. As shown in FIG. 5, the UMA node includes server components, such as a processor, graphics card, input/output (I/O) interface, memory controller, memory bus, I/O controller, peripheral component interconnect (PCI) or PCI express (PCIe) interface, etc. The UMA node also includes memory components, such as one or more memory modules coupled to the memory bus and storage coupled to the PCI or PCIe interface. Any one or more of the memory modules and the storage could be a UMA memory unit.

Figure 6A:
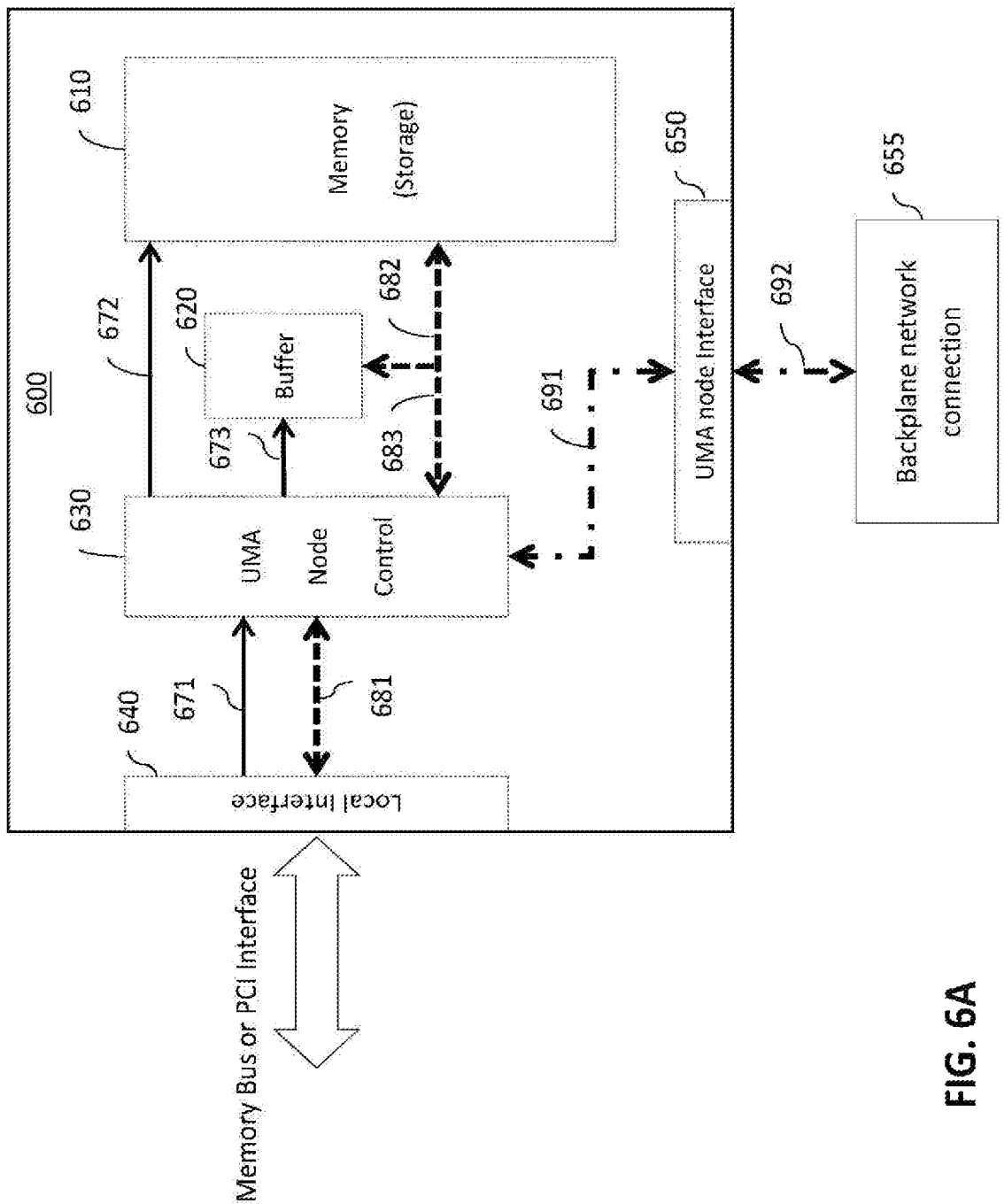
FIGS. 6A and 6B are block diagrams of exemplary UMA memory units according to certain embodiments.
Figure 6B:
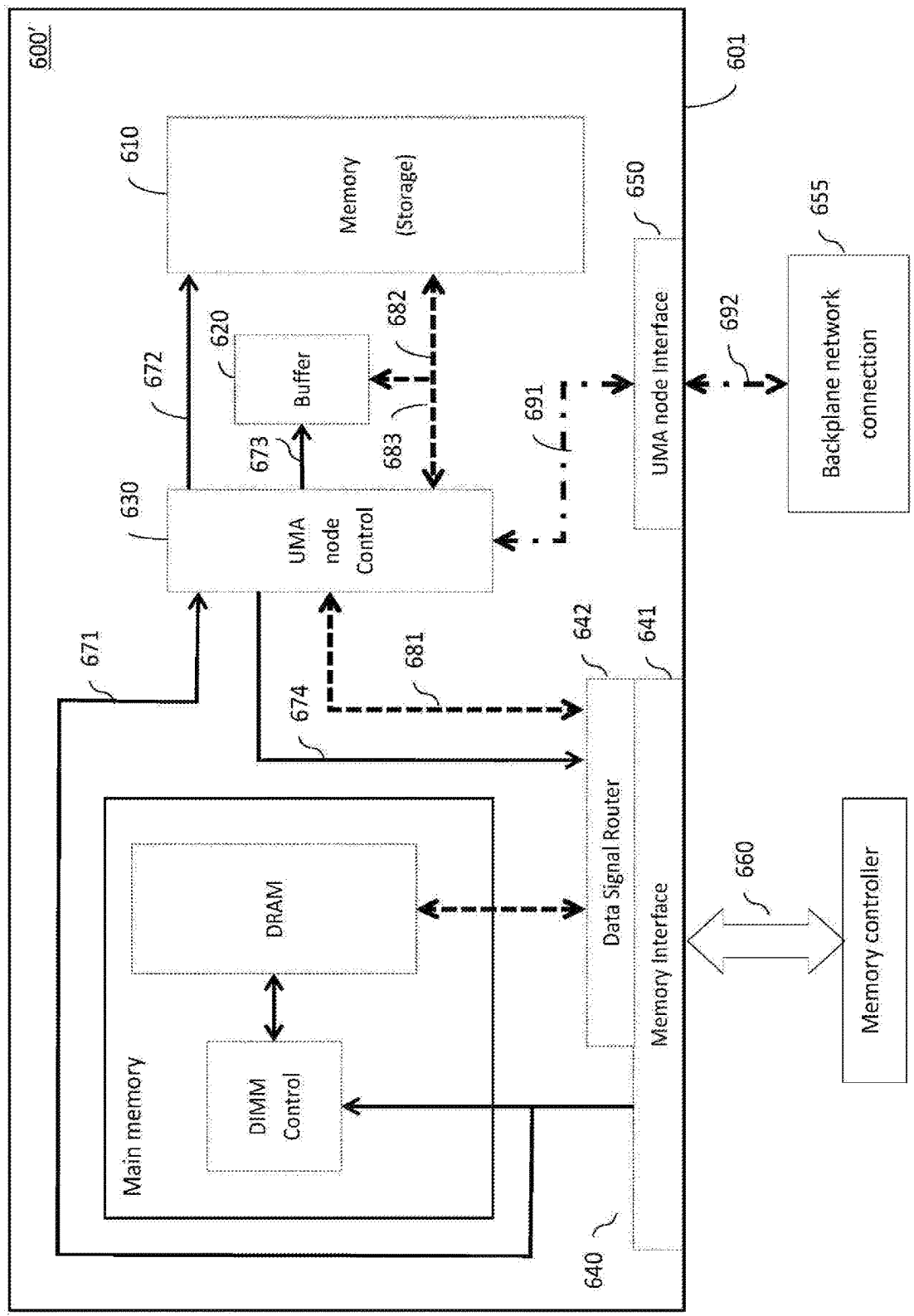

FIGS. 6A and 6B are block diagrams of exemplary UMA memory units 600, 600' according to certain embodiments. As shown in FIG. 6A, the UMA memory unit 600 includes a persistent storage memory unit 610 (e.g., Flash memory, hard disk drives (HDD), etc.), a non-persistent buffer memory unit 620 (e.g., DRAM); and a node control device 630 operatively coupled to the persistent memory unit 610 and the non-persistent memory unit 620. The UMA memory unit further includes a local interface 640 for interfacing with the server in the same UMA node (local server) via the server's memory bus or PCI/PCIe interface, and a UMA node interface 650 (or network interface) for interfacing with the UMA network through a backplane network connection 655. The UMA network interface 650 can be a standard Ethernet interface, optical interface, or any type of communication method including a serial bus interface. The local UMA memory unit further include control signal paths 671, 672, 673 (illustrated as solid lines), data signal paths 681, 682, 683 (illustrated as dashed lines), and network packet paths 691, 692 (illustrated as dash/dot lines).

The non-persistent buffer memory (DRAM) 620 in the UMA node is used as a buffer to queue read/write data from/to the persistent memory (storage) 610 so as to match the data flow rate with the network interface. In certain embodiments, the UMA network interface 650 can be used by the local server to concurrently access multiple UMA nodes in the UMA network. So, the data transfer rate for the UMA network interface can be much faster than the data retrieval rate at each individual UMA node.

In certain embodiments, as shown in FIG. 6B, the UMA memory unit 600' can be implemented as a dual inline memory module (DIMM) having a module board 601, with its components (i.e., the persistent memory unit 610, the non-persistent memory unit 620, and the node control device 630) mounted on the module board 601. The local interface 640 includes a main memory interface 641 having edge connections (not shown) on the module board for inserting into a module slot on a motherboard of the local server so as to couple the memory module to the memory bus 660 of the local server. The UMA DIMM further includes a main memory component, which in turn includes dynamic random access memory (DRAM) and a DIMM control device (or register device). The local interface 640 further includes a data signal router 642 controlled by the UMA node control device 630 via control signal path 674. The data signal router routes data signals between the memory bus 660 and the main memory component, or between the main memory and the UMA node control device 630, or between the memory bus 660 and the UMA node control device 630, depending on whether the local server is accessing the main memory or the persistent memory unit on this particular UMA DIMM or on any other UMA memory unit in the UMA network, as determined by the UMA node control device 630.

Figure 7:
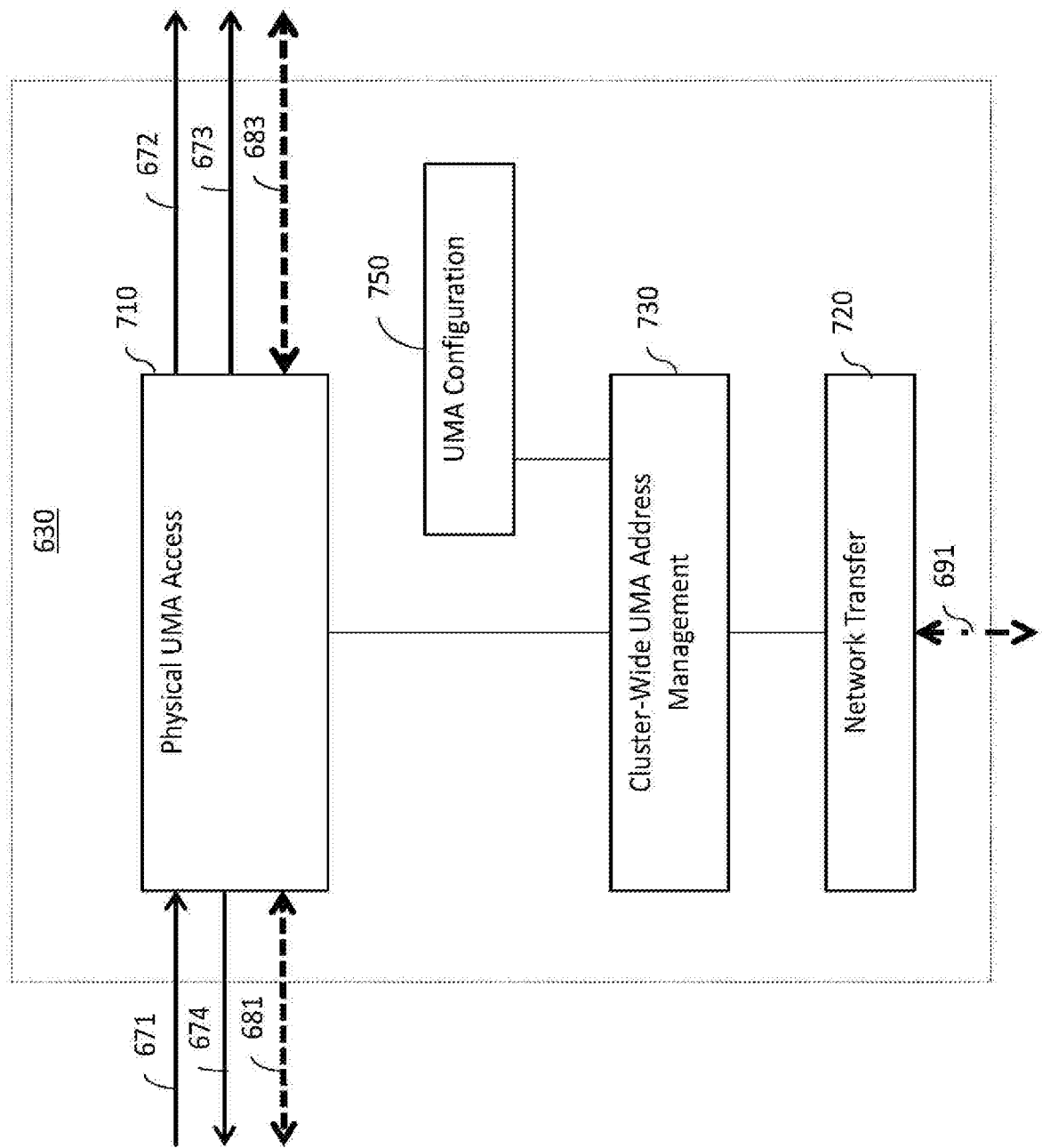
FIG. 7 is a block diagram of a UMA node control device according to certain embodiments.

FIG. 7 is a block diagram of a UMA node control device 630 according to certain embodiments. As shown in FIG. 7, the UMA node control device 630 comprises a set of control logic including physical UMA access logic 710, network transfer logic 720, cluster-wide UMA address management logic 730; and UMA configuration logic 750. The physical UMA access logic is configured to control access by the local server of the persistent memory unit via the local interface. The network transfer logic 720 is configured to facilitate packet-based communication between this UMA node and the other UMA nodes in the cluster of UMA nodes.

Thus, the UMA network 200 or a UMA storage system (e.g., the UMA memory unit 600, 600') uses a UMA protocol that includes a physical UMA access layer, a Network transfer layer, a Cluster-wide UMA address layer, and a UMA configuration layer. The physical UMA access layer is a protocol to access the physical local UMA storage device. The Network transfer layer is the interface protocol to communicate among UMA storage nodes in the network, which can be IP, FC, PCI, etc. Media access protocol and traffic control protocol in the network transfer layer can follow existing standards, but the protocol for UMA command and data packets are defined proprietarily. The network transfer layer can be implemented in the UMA memory units (or UMA storage device) or separately from the UMA storage device. However, the UMA storage system includes software that recognizes both the UMA storage function and Network function and registers them into its logic for its usage.

Figure 8:
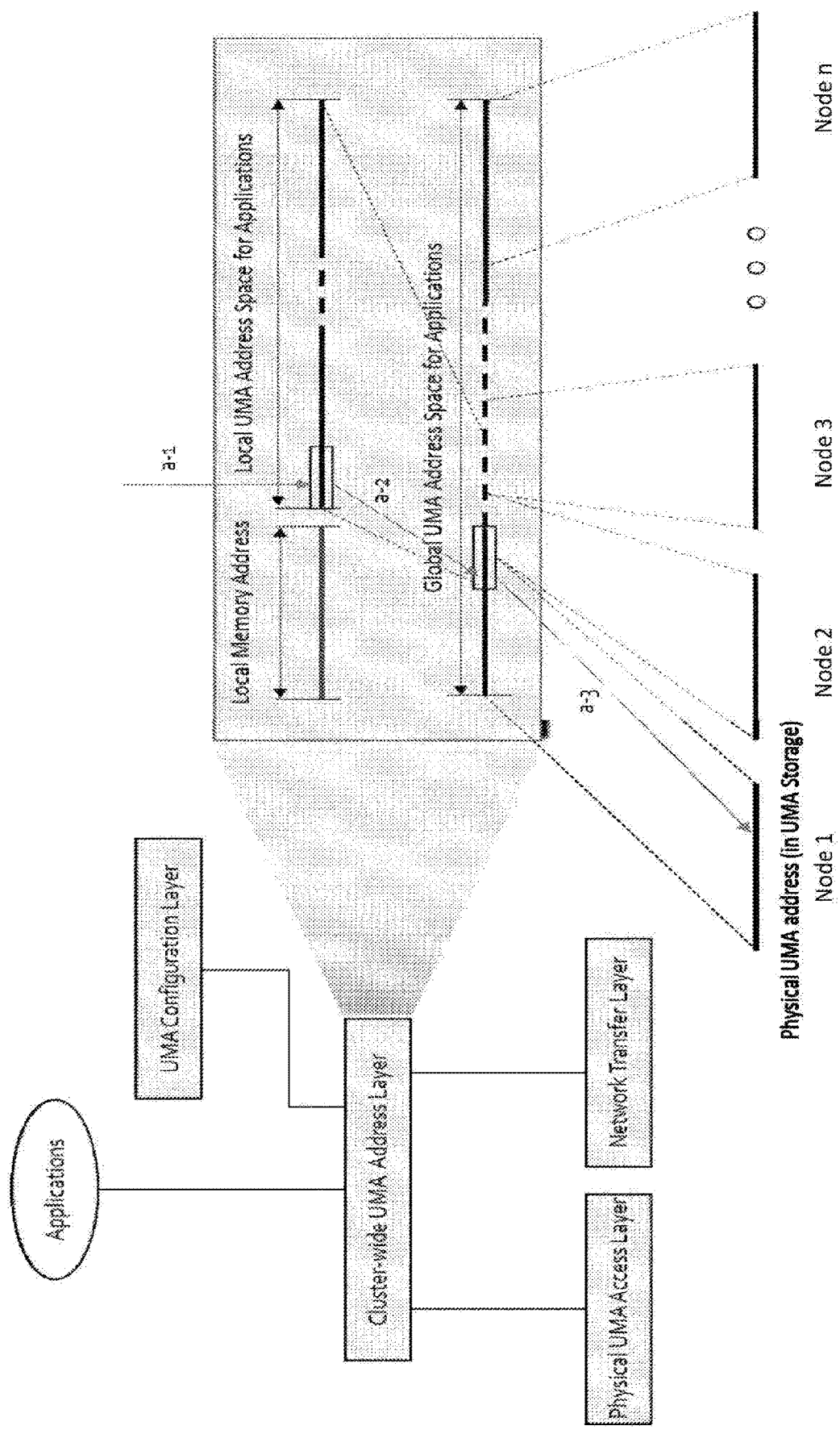
FIG. 8 is a diagram illustrating address translation in a UMA network according to certain embodiments.

In certain embodiments, applications running on the local server have access to a local memory address space corresponding to the memories associated with the local server and a local UMA address space corresponding the UMA storage space provided by the UMA cluster. The UMA node control monitors memory access requests from the local server via the control signal paths 671 and determines, for each memory access request, whether it is directed at the local memory space provided by, for example, the main memory, or the local UMA address space corresponding to memory units in the cluster of UMA nodes. FIG. 8 is a diagram illustrating address translation in a UMA network according to certain embodiments. As shown in FIG. 8, upon determination that the local server has requested access (a-1) to the local UMA address space, the cluster-wide UMA address management logic 730 is configured to translate (a-2) between the local UMA address space and a global UMA address space. The global UMA address space is then mapped (a-3) to a physical UMA address space. In certain embodiments, the physical UMA address space includes separate physical address spaces associated with respective UMA nodes (e.g., Node 1, Node 2, . . . , Node n) in the cluster of UMA nodes. Thus, the UMA node control device provides access of the physical address spaces associated with the other UMA nodes for the applications running on the local server.

In certain embodiments, the physical UMA access logic includes a UMA node arbiter that arbitrates the Flash/storage accesses either from the UMA network or from the local server (the system) via the main memory. The non-persistent buffer memory (DRAM) in the UMA node is not directly accessible by the system since its address space is not defined in the local server main memory address space, but it is defined in the local UMA address space. The arbiter schedules the storage access in the UMA node based on fairness and quality of service (QoS) such that all access requests are given the same level of priority unless the requester requests for a higher priority.

The higher priority requests are processed such that a few initial packets are sent out based on the elevated priority, but the priority level reduces to a lower level as more data packets are transferred. One other possible way of achieving fairness and QoS is use a credit based access priority. For example, all servers have the same number of priority credits that renews periodically, and a preset priority credits is assigned to each priority level. A server request for a UMA node access with higher priority needs to spend more priority credit, and the server cannot request any more higher priority accesses when all priority credits are used up. It is also possible that the unused priority credits can be transferred to the next priority credit renewal period, or transferred up to other servers.

Figure 9:
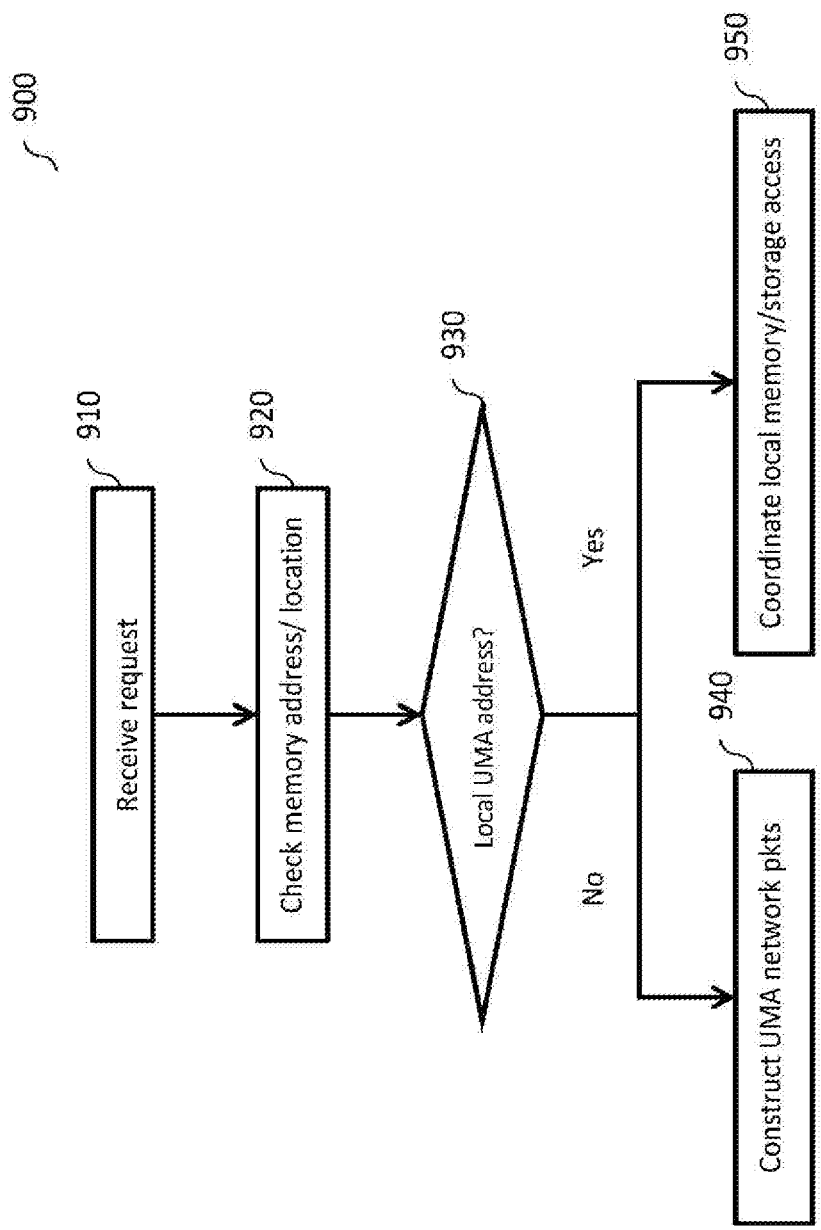
FIG. 9 is a flowchart illustrating a method performed by a UMA node according to certain embodiments.

In certain embodiments, the local server can access the local UMA memory unit without going through the network interface, but the access request still needs to be arbitrated by the UMA node arbiter. FIG. 9 is a flowchart illustrating a method 900 performed by the UMA node arbiter according to certain embodiments. As shown in FIG. 9, upon receiving (910) a access request from the local server, the UMA node arbitor cooperates with the cluster-wide UMA address logic to check (920) the memory address/location associated with the access request, and determines (930) whether the memory address/location is in the local memory address space. In response to the memory address/location being in the local memory address space, the UMA arbitor coordinates (950) local memory/storage access. In response to the memory address/location not being in the local memory address space, the UMA arbitor starts the process of constructing (940) and processing UMA network packets.

Figure 10:
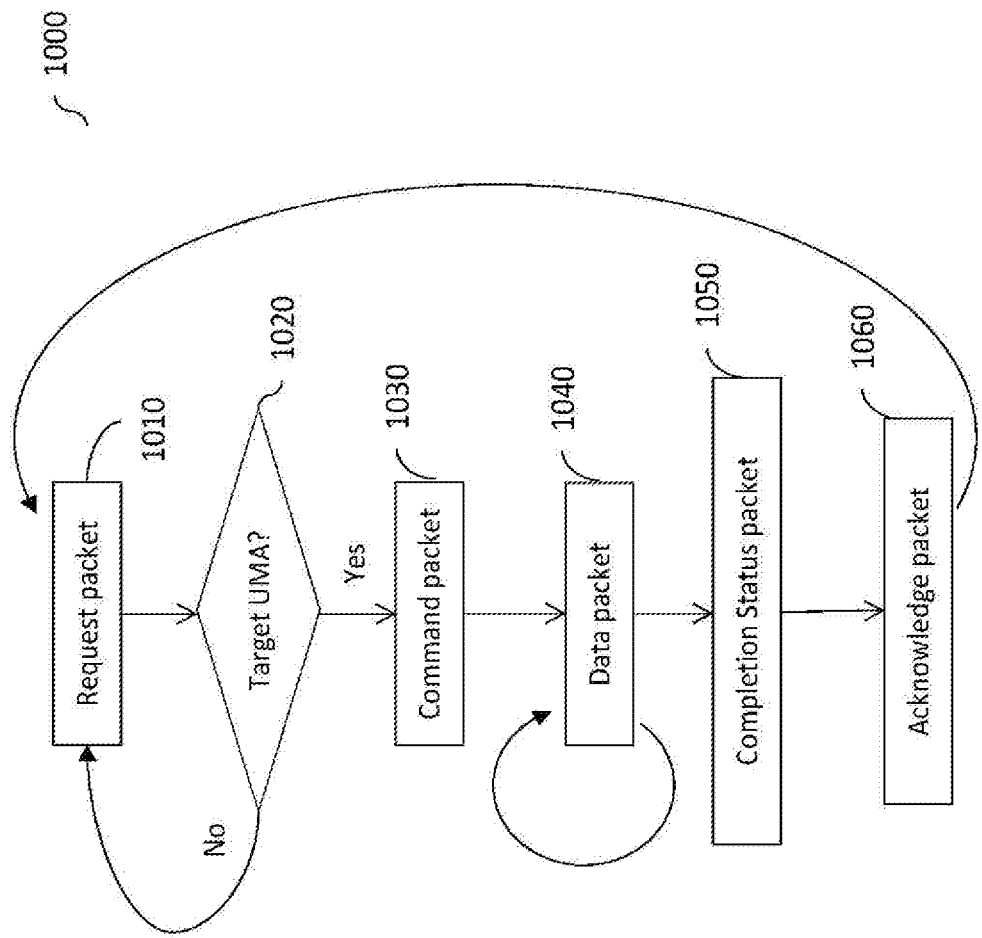
FIG. 10 is a flowchart illustrating a UMA process according to certain embodiments.

FIG. 10 is a flowchart illustrating a UMA network communication process 1000 (referred sometimes in as "UMA process") according to certain embodiments. This flow chart applies to various UMA access cases regardless of the network connection type or the network arbitration type. The UMA process 1000 starts with a server at a source UMA node (requester) requesting access to a memory address/location that is not in its local memory address space. In response, the UMA node control at the source UMA node constructs a UMA request packet and transmits (1010) the request packet to the UMA network via the UMA network interface at the source UMA node.

FIG. 11A is a block diagram of an exemplary UMA request packet 1110 according to certain embodiments. As shown in FIG. 11A, the request packet includes information such as a packet type (e.g., UMA request), a UMA node address, a source (requester) address, an access type, access priority, total byte size of data to be transferred, and error detection code (e.g., cyclic redundancy check (CRC) code), etc. The UMA node address in the request packet can be a specific UMA node address or a generic UMA node address. The access type can be Read start, Write start, Status request, Standby, etc. The Standby access type is used to inform another UMA node to execute a 'malloc' operation for the total number of bytes. After the Standby access type, the requester may send another request packet for a completion status packet to ensure that the other UMA node has prepared the memory space. The requester may send multiple Write_Start type of request packets to the reserved UMA memory space.

After sending out the request packet, the source UMA node waits for a response from a target UMA node. When a generic UMA node address is sent out with a request packet, any available UMA node can respond. Thus, there could be more than one UMA node that responds to the request packet with a generic UMA node address. To minimize multiple responses from different UMA nodes, each UMA node listens to the network traffic, and if it detects any responses including requester address with zero total number of bytes and zero data packets transferred, it ignores the request packet since it is likely that the response is from a closest UMA node. In case the requester receives more than one response, it can choose a UMA node as the target UMA node, and send out a request packet with the target UMA node.

In certain embodiments, the request packet is repeated until the target UMA node responds with an acknowledge packet indicating that it is available. Upon receiving (1020) such an acknowledgement packet from the target UMA node, the source UMA node sends out (1030) a command packet to tell the target UMA node to prepare for data packet(s). The target UMA node needs to ensure that the available input buffer is large enough to receive/send the total number of data bytes that are transferred with one or more data packets. FIG. 11B is a block diagram of an exemplary UMA command packet 1120 according to certain embodiments. As shown in FIG. 11B, the command packet 1120 includes information such as a packet type (e.g., UMA command), the target UMA node address, the source (requester) address, a start UMA memory address at the target UMA node, a CRC on/off indicator, dynamic real-time commands, and associated data size and CRC code, etc. The data size in the command packet can be the total number of data bytes to be transferred in response to the command packet.

The data size in the command packet is used to maximize transfer efficiency such that the requester can modulate the data packet size to maximize the data transfer success rate. For example, in a noisy system, the requester may reduce the packet size to optimize the bit error rate per transfer. The dynamic real time command is used for transfer interrupt, pause, stop, terminate, retransmit, etc. For example, if the requester receives a data packet with an error, it can send a command packet to the UMA node to retransmit the data from the start memory address and data packet size.

After transmitting the command packet to the target UMA node, the requester either sends or receives (1040) data packets. FIG. 11C is a block diagram of an exemplary UMA data packet 1130 according to certain embodiments. As shown in FIG. 11C, the data packet 1130 includes information such as a packet type (e.g., data), the target UMA node address, the source (requester) address, a transfer sequence number, data, and CRC code, etc. The transfer sequence number may be used to indicate an order of the data packet in a sequence of data packets associated with the command packet.

In certain embodiments, the target UMA node performs a UMA process that mirrors the UMA process at the source UMA node. As shown in FIG. 10, upon receiving (1010) the request packet, the target UMA node determines (1020) whether the UMA node address indicates that the request packet is directed at the target UMA node. If the answer is no, it goes back to attend to the next request packet. If the answer is yes, it responds to the requester that it is ready and receives (1030) from or transmits to the requester the command packet. Afterwards, the target UMA node transmits or receives (1040) the data packets.

The sender of the data packets transmits (1050) a completion status packet to the UMA network after transmitting the sequence of the data packets to the UMA network. For example, if the access type is for a memory write access, the completion status packet is generated by the requester. On the other hand, if the access type is for a memory read access, the completion status packet is generated by the target UMA node, which has sent the data packets. FIG. 11D is a block diagram of an exemplary completion status packet 1140 according to certain embodiments. As shown in FIG. 11D, the completion status packet 1140 includes information such as a packet type (e.g., completion status), the target UMA node address, the source (requester) address, a total number of bytes transferred, a number of data packets transferred, and CRC code, etc.

The receiver of the completion status packet sends back 1060 the acknowledge packet. FIG. 11E is a block diagram of an exemplary acknowledge packet 1150 according to certain embodiments. As shown in FIG. 11E, the acknowledge packet 1150 includes information such as a packet type (e.g., acknowledge), the target UMA node address, the source (requester) address, a total number of bytes transferred, a number of data packets transferred. The acknowledge packet may also include static information such as a total transfer time, average data payload in the data packets, error rate, sequence number(s) of any data packets that are erroneous (e.g., (write data packet with CRC error), and CRC code, etc. For example, in the case of memory write, if the requester receives an error data packet sequence number, it can retransmit with the request packet after it receives the completion status packet, or just retransmit the command packet followed by the data packet that was reported as an error packet. In this case the command packet will indicate that it is a retransmit. In certain embodiments, if the requester needs to retransfer the error packets, it needs to restart with a request packet.

The requester UMA node completes the data transfer activity when it transmits (in the case of memory read) or receives (in the case of memory write) the acknowledge packet without any indication of error. The target UMA node completes the data transfer activity when it receives (in the case of memory read) or transmits (in the case of memory write) the acknowledge packet.

Thus, according to certain embodiments, applications running on a server or computing system in the UMA network can have its associated storage area distributed across UMA storages in different UMA nodes (computing nodes), as shown in FIGS. 12A-12B. As described above, the network functionality of the storage devices can be included internally in the UMA storages or externally in the Node system. One example of the physical interface between the UMA storage and the computing system can be memory interface (e.g., DIMM), PCIe interface and etc., as shown in FIG. 12A, where Application A uses UMA storage area A-#0 in computing node #0, UMA storage area A-#1 in computing node #1, and UMA storage area A-#2 in computing node #2. Hence, the UMA storage area for application A is (A-#0)+(A-#1)+(A-#2).

Another example of the physical interface between the UMA storages and the computing system can be PCI, Internet Protocol (IP), Fiber Channel (FC) network etc., wherein the UMA storages are separate from their associated computing systems, and are connected to the computing systems via a network, as shown in FIG. 12B. In this example, a cluster-wide memory address can be used.

Thus, the cluster-wide UMA address layer provides a single global address space among all UMA storage devices in the network and functions to translate between the Local UMA address for applications and the cluster-wide UMA address, or between the cluster-wide UMA address and the physical UMA address. For example, when an application accesses a part of the local UMA address space (a-1 in FIGS. 12A and 12B), the cluster-wide UMA address layer translates the local UMA address to a specific cluster-wide address and confirms which nodes have that specific cluster-wide address. Then, a request of the application is transferred to the designated target physical UMA addresses.

Figure 13:
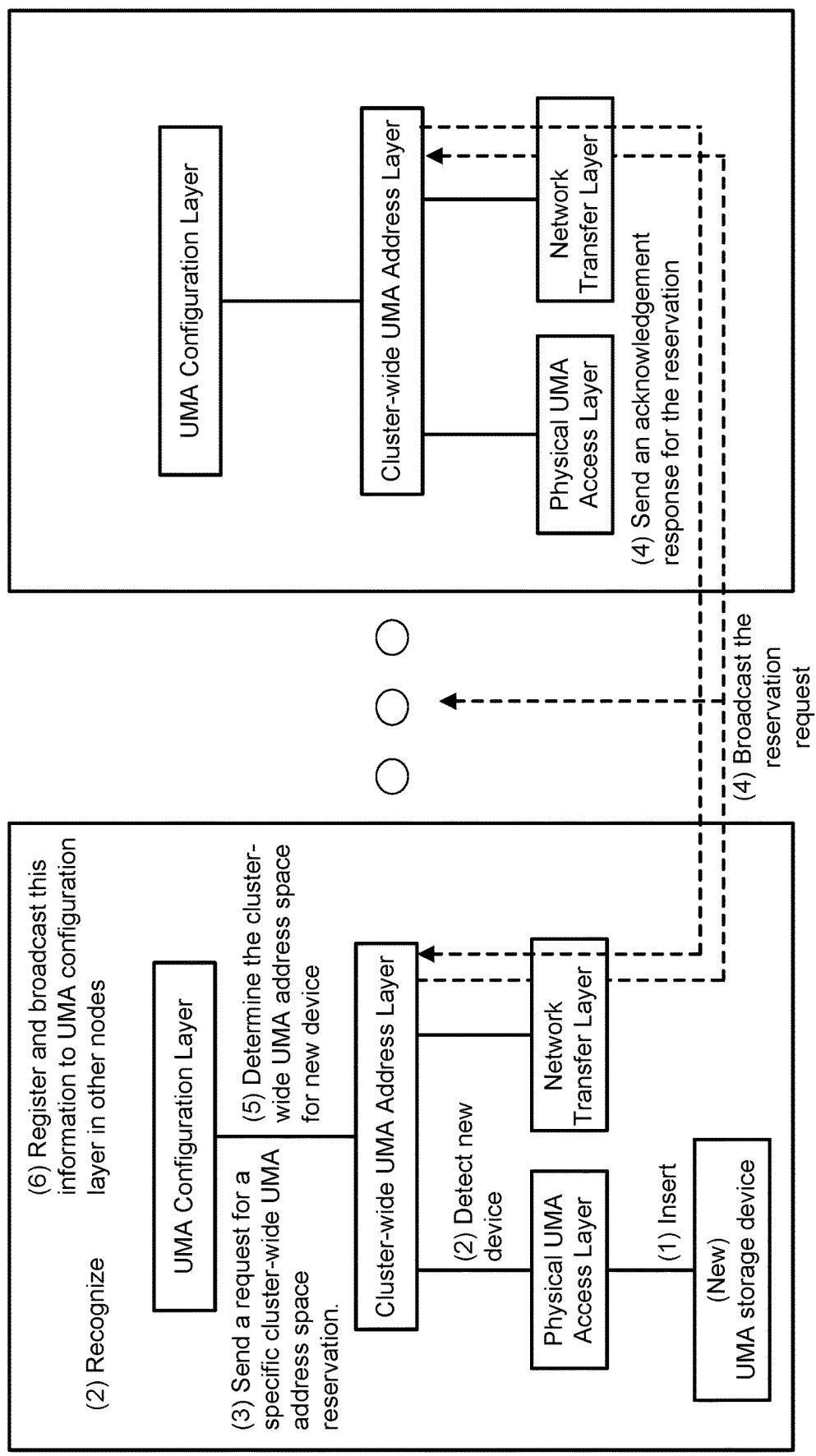
FIG. 13 is a diagram illustrating a process of inserting a new UMA storage device into a UMA network according to certain embodiments.

FIG. 13 is a diagram illustrating a process of inserting and registering a new UMA storage device into a UMA network according to certain embodiments. For example, when a new UMA storage device is inserted (1), the physical UMA access layer detects (2) the new UMA storage device and informs this detection to the UMA configuration layer. The UMA configuration layer recognizes (2) this detection and causes a user setup menu to be displayed. A user can determine how to allocate a cluster-wide UMA address space to the new device and causes a request for this address space to be generated. The cluster-wide UMA address layer broadcasts (4) the address reservation request, and each UMA storage responses (4). Then, the cluster-wide UMA address layer determines (5) the cluster-wide UMA address space for the new UMA storage device, and the UMA configuration layer registers and broadcasts (6) this updated information to the UMA configuration layer in other nodes. In certain embodiments, the UMA configuration layer is used to define how new UMA storages join an existing UMA storage cluster, and how to allocate UMA address for a local application or computing node. For example, when a new UMA storage device joins, its address space can be allocated continuously or into separate groups in a global UMA address space. QoS and locality can be considered when a global UMA address space is allocated for local application of each node.

Figure 14:
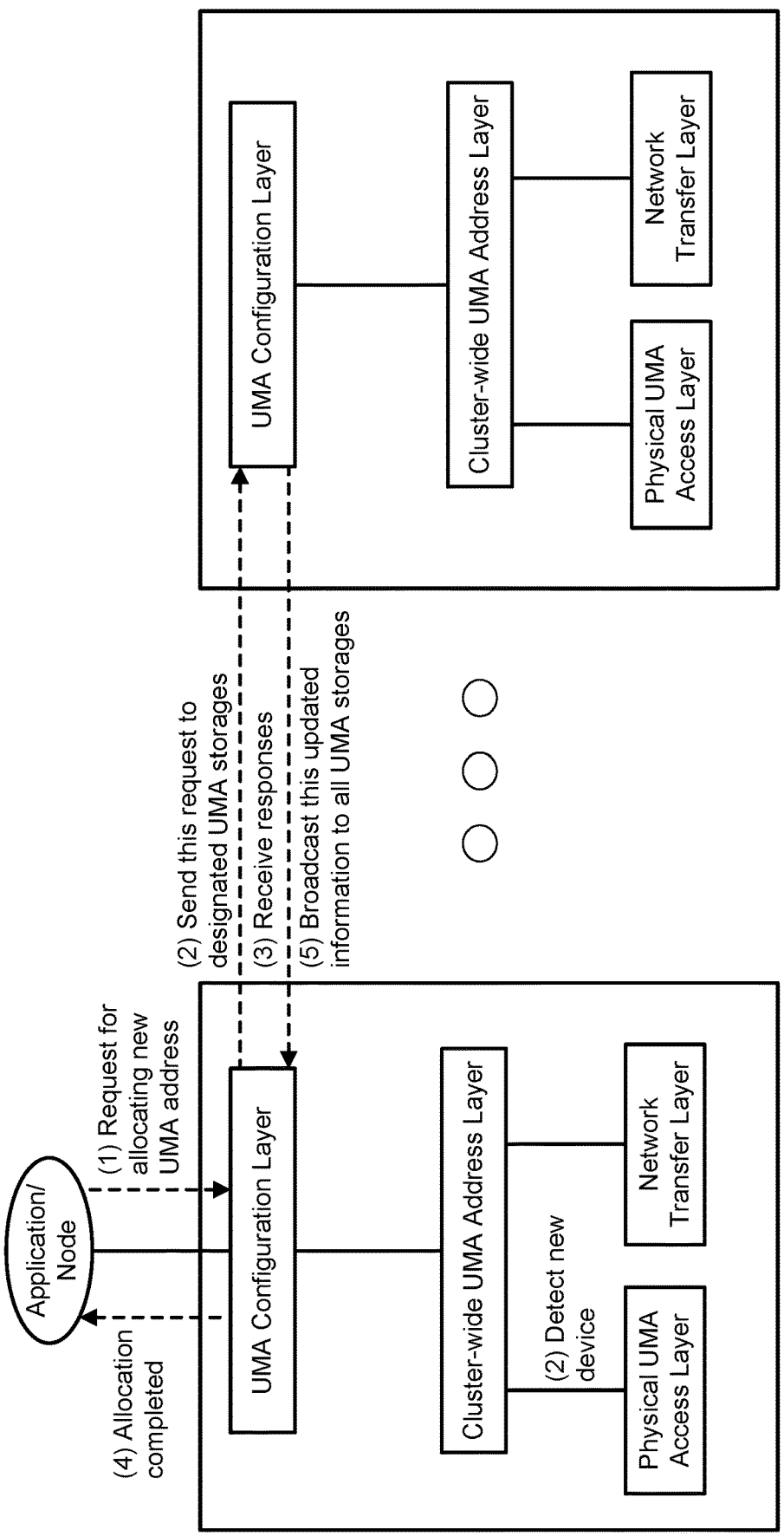
FIG. 14 is a diagram illustrating a process of allocating a new UMA address in a UMA network according to certain embodiments.

FIG. 14 is a diagram illustrating a process of allocating a UMA address for an application or a node in a UMA network according to certain embodiments. As shown in FIG. 14, after an application or node requests (1) a UMA storage area, the UMA configuration layer sends (2) this request to designated UMA storages, and the correspondent UMA storages would send responses (3). After receiving the responses, the UMA configuration layer sends a message "allocation completed" to the requestor. The UMA configuration layer then broadcasts this updated information to all UMA storages. In certain embodiments, the UMA configuration layer allows the user some choices (such as QoS, locality, etc.) on how the request is handled.

Figure 15:
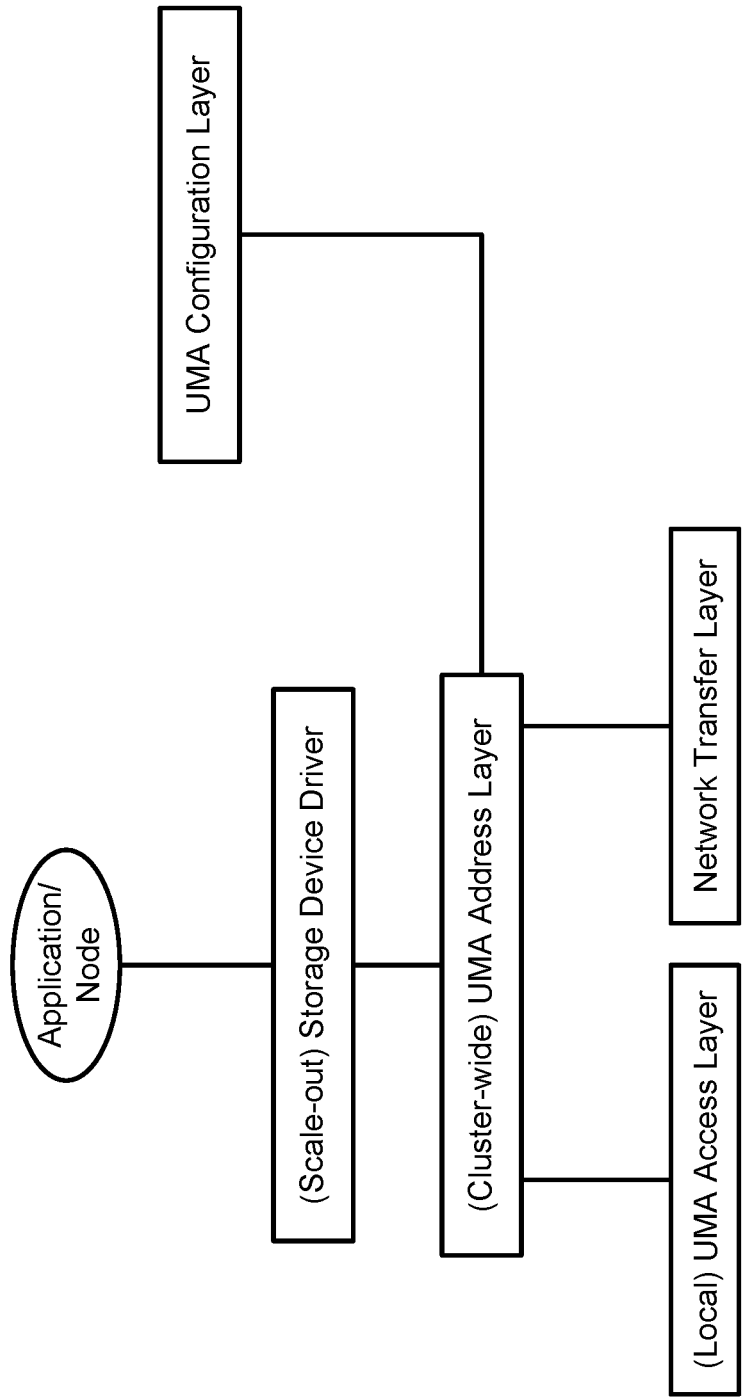
FIG. 15 is a diagram illustrating a scale-out storage system provided by the UMA storage devices in the UMA network according to certain embodiments.

FIG. 15 is a diagram illustrating a scale-out storage system provided by the UMA storage devices in the UMA network according to certain embodiments. A Scale-out storage system can be made because the UMA storage system provides a cluster-wide UMA address space. To build a scale-out storage system based on the UMA storage devices, a (scale-out) storage device driver is devised. This storage device driver exports a block device interface to the file systems, data base system, and applications. In this example, each application does not need to know the entire UMA storage (cluster) address space. The UMA storage (cluster) address is managed by the UMA configuration layer, and each application only needs to manage its own allocated (targeted) storage space since there is no overlapping of the physical UMA address, and there is one-to-one mapping between the physical UMA address and the targeted address by each application node.

We claim:

1. A memory module operable in a first node among a cluster of nodes in a network, the first node including a server, the memory module comprising:
    persistent memory configurable to provide data storage associated with the first node;
    non-persistent memory configurable to buffer data to or from the persistent memory;
    a first interface configurable to interface with the server;
    a second interface configurable to interface with the network; and
    a node control device operatively coupled to the persistent memory and the non-persistent memory, the node control device including logic configurable to:
        receive via the first interface a first request from the server to access data storage at another node among the cluster of nodes, the first request including a first address in a local unified memory access (UMA) address space accessible by applications running on the server;
        translate the first address to a second address in a global UMA address space, the global UMA address space being mapped to a physical UMA address space including physical address spaces associated with data storages in the cluster of nodes;
        determine a first target node among the cluster of nodes based on the second address in the global UMA address space; and
        transmit a first request packet to the network via the second interface, the first request packet including a first target network address for the first target node.

2. The memory module of claim 1, wherein the first interface includes one or more of:
a main memory interface coupled to a memory bus of the server;
a peripheral component interconnect (PCI) interface;
a PCI express (PCIe) interface;
a Fiber Channel (FC) interface: and an Internet Protocol (IP) interface.

3. The memory module of claim 1, wherein the second interface includes one or more of an Internet Protocol (IP) interface and a Fiber Channel (FC) interface.

4. The memory module of claim 1, wherein the first request packet further includes an access type, and a size of data to be transferred in response to the first request.

5. The memory module of claim 1, wherein the node control device is further configurable to, in response to the first target node acknowledging receipt of the first request packet:
form a first command packet including a packet type, a network address of the first node, the first target network address of the first target node, a storage address at the first target node, and a data size;
transmit the first command packet to the network via the second interface;
communicate one or more first data packets with the first target node via the second interface subsequent to transmitting the first command packet, each of the one or more first data packets identifying the first target node; and
communicate first data in the one or more first data packets with the server.

6. The memory module of claim 1, wherein the node control device is further configurable to:
receive a second request packet from the network via the second interface, the second request packet including a second target network address and a requester address;
receive a second command packet from the network via the second interface in response to the second target network address indicating that the first node is targeted by the second request packet; and
communicate one or more second data packets via the second interface in accordance with the second command packet;
wherein data in the one or more second data packets is buffered in the non-persistent memory, and read from or written into the persistent memory.

7. The memory module of claim 1, wherein the node control device is further configurable to:
receive a third request packet from the network via the second interface, the third request packet including a third target network address and a requester address; and
repeat the third request packet to a next node in the cluster of nodes in response to the third target network address indicating that the first node is not targeted by the third request packet.

8. The memory module of claim 1, wherein the node control device is further configurable to:
modify the local UMA address space and the global UMA address space in response to a new node being inserted into the cluster of nodes; and
broadcast reservation of a space for the new node in the global UMA address space to other nodes in the cluster of nodes.

9. The memory module of claim 1, wherein the node control device is further configurable to:

receive from an application running on the server a request for a UMA storage area;
send the request to a designated UMA node;
receive a response from the designated UMA node that the UMA storage area has been allocated to the application;
inform the application that the UMA storage area has been allocated to the application; and
broadcast to other nodes in the cluster of nodes that the UMA storage area has been allocated to the application.

10. The memory module of claim 1, further comprising main memory, wherein:
the first interface includes a main memory interface coupled to a memory bus in the server, and a data signal router coupled to the main memory interface and controlled by the node control device; and
the data signal router is configurable by the node control device to selectively route data signals between the memory bus and the main memory, between the main memory and the node control device, or between the memory bus and the node control device, depending on whether the server is accessing the main memory, the persistent memory, or memory space in another node in the cluster of nodes.

11. A method, comprising:
at a first node among a cluster of nodes in a network, the first node including a server, persistent memory configurable to provide data storage, non-persistent memory configurable to buffer data to or from the persistent memory, a first interface configurable to interface with the server, and a second interface configurable to interface with the network,
receiving via the first interface a first request from the server to access data storage at another node among the cluster of nodes, the first request including a first address in a local unified memory access (UMA) address space accessible by applications running on the server;
translating the first address to a second address in a global UMA address space, the global UMA address space being mapped to a physical UMA address space including physical address spaces associated with data storages in the cluster of nodes;
determining a first target node among the cluster of nodes based on the second address; and
transmitting a first request packet to the network via the second interface, the first request packet including a first target network address for the first target node.

12. The method of claim 11, wherein the first interface includes one or more of:
a main memory interface coupled to a memory bus of the server;
a peripheral component interconnect (PCI) interface;
a PCI express (PCIe) interface;
a Fiber Channel (FC) interface: and an Internet Protocol (IP) interface.

13. The method of claim 11, wherein the second interface includes one or more of an Internet Protocol (IP) interface and a Fiber Channel (FC) interface.

14. The method of claim 11, wherein the first request packet further includes an access type, and a size of data to be transferred in response to the first request.

15. The method of claim 11, further comprising, in response to the first target node acknowledging receipt of the first request packet:
forming a first command packet including a packet type, a network address of the first node, the first target network address of the first target node, a storage address at the first target node, and a data size;

transmitting the first command packet to the network via the second interface;

communicating one or more first data packets with the first target node via the second interface subsequent to transmitting the first command packet, each of the one or more first data packets identifying the first target node; and communicating first data in the one or more first data packets with the server.

16. The method of claim 11, further comprising:

receiving a second request packet from the network via the second interface, the second request packet including a second target network address and a requester address;

receiving a second command packet from the network via the second interface in response to the second target network address indicating that the first node is targeted by the second request packet; and communicating one or more second data packets via the second interface in accordance with the second command packet;

wherein data in the one or more second data packets is buffered in the non-persistent memory, and read from or written into the persistent memory.

17. The method of claim 11, further comprising:

receiving a third request packet from the network via the second interface, the third request packet including a third target network address and a requester address; and repeating the third request packet to a next node in the cluster of nodes in response to the third target network address indicating that the first node is not targeted by the third request packet.

18. The method of claim 11, further comprising:

modifying the local UMA address space and the global UMA address space in response to a new node being inserted into the cluster of nodes; and broadcasting reservation of a space for the new node in the global UMA address space to other nodes in the cluster of nodes.

19. The method of claim 11, further comprising:

receiving from an application running on the server a request for a UMA storage area;

sending the request to a designated UMA node;

receiving a response from the designated UMA node that the UMA storage area has been allocated to the application;

informing the application that the UMA storage area has been allocated to the application; and broadcasting to other nodes in the cluster of nodes that the UMA storage area has been allocated to the application.

20. The method of claim 11, wherein the first node further includes main memory coupled to the server via a memory bus and a node control device operatively coupled to the main memory, the persistent memory and the non-persistent memory, the method further comprising:

selectively routing data signals between the memory bus and the main memory, between the main memory and the node control device, or between the memory bus and the node control device, depending on whether the server is accessing the main memory, the persistent memory, or memory space in another node in the cluster of nodes.

* * * * *